United States Patent [19]

Omoto

[11] Patent Number: 4,460,991
[45] Date of Patent: Jul. 17, 1984

[54] PICKUP DEVICE FOR DISC PLAYER

[75] Inventor: Hideo Omoto, Hamamatsu, Japan

[73] Assignee: Nippon Gakki Kabushiki Kaisha, Japan

[21] Appl. No.: 379,957

[22] Filed: May 19, 1982

[30] Foreign Application Priority Data

May 28, 1981 [JP] Japan .............................. 56-78006[U]
May 28, 1981 [JP] Japan .............................. 56-78007[U]

[51] Int. Cl.³ .............................................. G11B 3/10
[52] U.S. Cl. ..................................... 369/230; 369/221
[58] Field of Search ............... 369/217, 220, 221, 224, 369/230

[56] References Cited

U.S. PATENT DOCUMENTS

3,503,615  3/1970  Matsuda ............................. 369/230
3,675,932  7/1972  Rabinow ............................ 369/224
4,083,565  4/1978  Iyeta .................................. 369/220

Primary Examiner—Steven L. Stephan
Attorney, Agent, or Firm—Darby & Darby

[57] ABSTRACT

A pickup device for a disc player includes a pickup arm pivotally mounted at one end thereof for movement between upper and lower positions. The pickup arm is horizontally movable about the one end thereof. A drive device is responsive to a driving signal from a control circuit to drive an arm lifter for moving the pickup arm between its upper and lower positions. A brake device is also responsive to the driving signal for holding the pickup arm against the horizontal angular movement during its vertical movement.

8 Claims, 7 Drawing Figures

PICKUP DEVICE FOR DISC PLAYER

BACKGROUND OF THE INVENTION

1. Field of the Invention

This invention relates generally to a pickup device for disc players such as a phonograph record player and a video disc player and more particularly to such a pickup device having brake means for holding a pivotal pickup arm against an accidental horizontal angular movement during a vertical pivotal movement thereof.

2. Prior Art

As is well known in the art, a pickup arm of a pickup device is pivotally mounted at one end thereof on a casing for horizontal angular movement so that a stylus of a pickup cartridge carried by the pickup arm at the other end thereof can track a groove in a record disc surface. Such a conventional pickup device has the disadvantage that the pickup arm is often subjected to an accidental horizontal angular movement during a vertical pivotal movement thereof. This difficulty arises from the fact that the pickup arm is usually subjected to a counterforce exerted by twisted lead wires connected to the pickup cartridge and/or external forces applied by an inside-force-canceller, so that the pickup arm can not be moved exactly between its predetermined upper and lower positions. This problem is serious particularly when the pickup arm is moved to its lower position, because the stylus is not brought into engagement in an aimed position with the groove in the record disc surface so that a record-playing can not be performed properly.

There has been proposed a pickup device having brake means for preventing a horizontal angular movement of the pickup arm during a downward movement thereof. This conventional brake means depends for its operation on cam means operatively associated with an arm lifter. Although this prior art pickup device has performed the intended braking function satisfactorily, it is somewhat complicated in mechanical construction.

SUMMARY OF THE INVENTION

With the above deficiencies of the prior art in view, it is an object of this invention to provide a pickup device for disc players having brake means for preventing a horizontal angular movement of a pickup arm during a downward movement thereof which brake means is reliable in operation and simple in construction. According to the present invention, there is provided a pickup device for a disc player comprising a pickup arm pivotally mounted at one end thereof on a casing for movement between upper and lower positions, the pickup arm being horizontally angularly movable about the one end, and the pickup arm carrying a pickup cartridge at the other end thereof; an arm lifter operatively engaged with the pickup arm; control circuit means for producing a driving signal; drive means responsive to the driving signal for driving the arm lifter to move the pickup arm between its upper and lower positions; and brake means responsive to the driving signal for holding the pickup arm against the horizontal angular movement during its vertical movement.

DESCRIPTION OF THE PREFERRED EMBODIMENT

Figure 1:
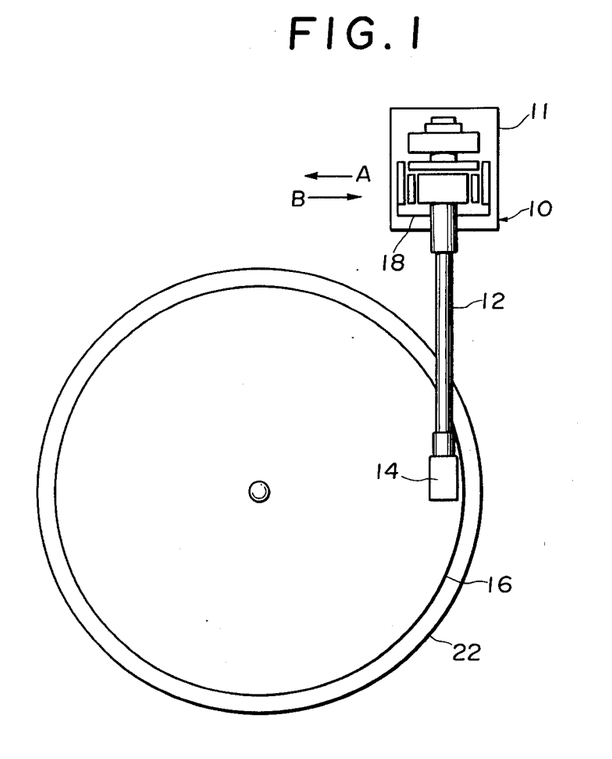
FIG. 1 is a plan view of a portion of a record player comprising a pickup device provided in accordance with the present invention.
Figure 2:
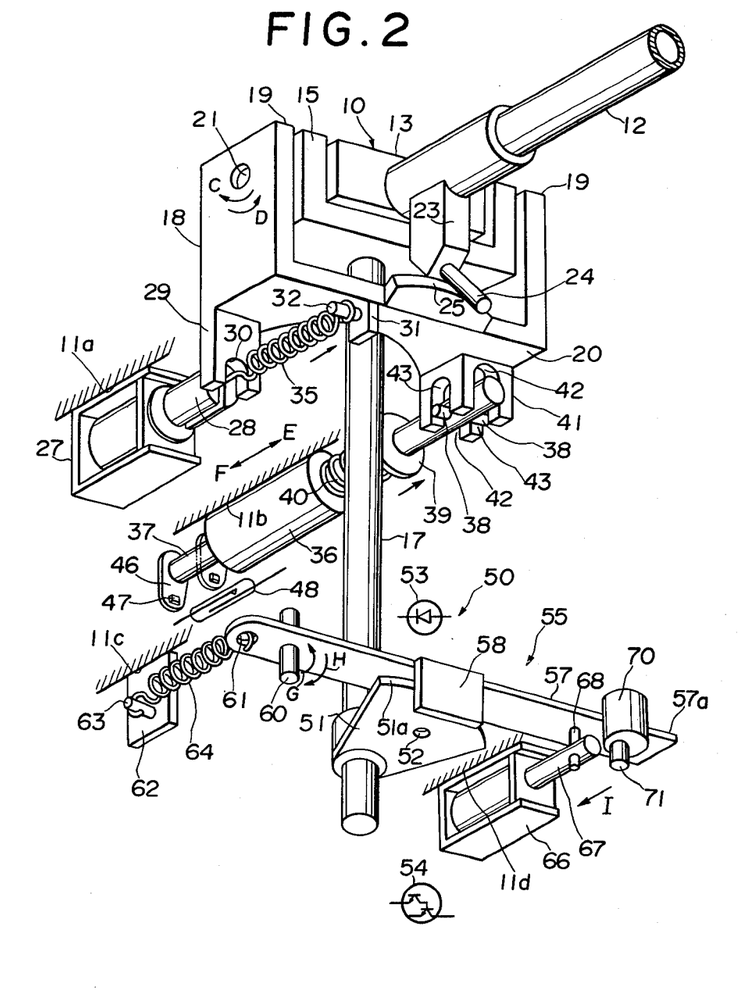
FIG. 2 is a fragmentary perspective view of the pickup device.

A pickup device 10 for a record player shown in FIGS. 1 and 2 is supported on a base 11 of a casing and comprises a pickup arm 12 fixedly secured at its one end to a horizontally-disposed mounting block 13 of a square cross-section, the pickup arm 12 having a pickup cartridge 14 attached to the other end thereof. The pickup device 10 is of the linear-tracking type and is movable in directions A and B (FIG. 1) along a linear track on the casing. With this construction, during the record-playing, the pickup arm 12 is movable toward the center of a record disc 16 in the direction A, the pickup arm 12 being disposed in a direction generally tangential to a circular groove in the record disc 16 placed on a turntable 22. The mounting block 13 is received in and supported by a support member 15 of a channel-shaped cross-section for angular movement relative to the support member 15 about a horizontal axis. A vertically-disposed rod 17 is fixedly secured at its upper end to the bottom of the support member 15, the rod 17 being mounted on the base 11 for angular movement about its longitudinal axis.

The support member 15 is received in an arm lifter 18 of a channel-shaped cross-section defined by a pair of side walls 19 and 19 and a bottom wall 20, the arm lifter 18 being mounted on the support member 15 by a pair of horizontally-disposed pins 21 for angular movement thereabout in opposite directions C and D as shown in FIG. 2.

A projection 23 depends from the pickup arm 12 adjacent to the mounting block 13, and an engaging pin 24 extends downwardly from the projection 23 at the lower end thereof and is inclined relative thereto as shown in FIG. 2. The arm lifter 18 has an actuator portion 25 projecting generally horizontally from a front edge of the bottom wall 20 of the arm lifter 18, the actuator portion 25 is held in contact with the engaging pin 24.

A cueing solenoid 27 is fixedly mounted on a mounting wall 11a of the base 11 and has a plunger 28 operatively associated therewith. A lug 29 depends from the bottom wall 20 of the arm lifter 18 at a left-hand end thereof (FIG. 2), the lug 29 having a slot 30 formed in its lower end portion. A lug 31 is also formed on the underside of the bottom wall 20, and a retaining pin 32 extends horizontally from the lug 31. A coil spring 35 extends between and supported by the front end of the plunger 28 and the retaining pin 32, the coil spring 35 passing through the slot 30.

An oil damper cylinder 36 is fixedly mounted on a mounting wall 11b of the base 11, and a piston rod 37 slidably extends longitudinally through the cylinder 36. A pair of diametrically opposed pins 38 and 38 are secured to a front end of the piston rod 37, and a collar 39 is fixedly mounted on the piston rod 37 at an intermediate position between the pins 38 and a front end of the cylinder 36. A compression coil spring 40 is wound around the piston rod 37 and acts between the front end of the cylinder 36 and the collar 39. An engaging member 41 of a generally square cross-section depends from the bottom wall 20 of the arm lifter 18 at a right-hand end thereof (FIG. 2). The engaging member 41 of a hollow construction has a pair of aligned apertures 42 and 42 formed through opposed side walls thereof, and a pair of aligned apertures 43 and 43 formed through opposed side walls thereof. The front end of the piston rod 37 is received in the apertures 42 and 42 with the pins 38 and 38 loosely fitted in the apertures 43 and 43, respectively.

With this construction, when the pickup arm 12 is in its upper or inoperative position, the plunger 28 is held in its extended position with its front end disposed in engagement with the lug 29, and the piston rod 37 is also held in its extended position under the influence of the compression coil spring 40. In this condition, the actuator portion 25 urges the engaging pin 24 upwardly to thereby retain the pickup arm 12 in its upper position. For starting a record-playing, the cueing solenoid 27 is energized to retract the plunger 28 in a direction F (FIG. 2) to angularly move the arm lifter 18 about the pins 21 in the direction C (FIG. 2) through the coil spring 35 so that the pickup arm 12 is moved downwardly together with the mounting block 13 through the actuator portion 25 and the engaging pin 24. Simultaneously with the movement of the plunger 28 in the direction F, the piston rod 37 is retracted in the direction F against the bias of the compression spring 40 through the pins 38 and the engaging member 41. This downward movement of the pickup arm 12 causes a stylus of the pickup cartridge 14 to make contact with the groove in the record disc 16 (FIG. 1).

When the pickup arm 12 is to be moved from its lower to upper position, the cueing solenoid 27 is de-energized whereupon the piston rod 37 is extended in the direction E under the influence of the compression spring 40 so that the arm lifter 18 is angularly moved in the direction D about the pins 21 through the pins 38 and the engaging member 41. This angular movement of the arm lifter 18 causes the pickup arm 12 to move into its upper position through the actuator portion 25 and the engaging pin 24. Thus, the stylus of the pickup cartridge 14 is brought out of engagement with the groove in the record disc 16. It will be appreciated that upon movement of the piston rod 37 in the direction F, the plunger 28 also moves in the direction F. The oil damper cylinder 36 serves to dampen the movement of the pickup arm 12 between its upper and lower positions so that the pickup arm 12 can be vertically moved smoothly.

Fixedly secured to the rear end of the piston rod 37 is a mounting plate 46 to which a permanent magnet 47 is attached. A magnetosensitive switching element 48 in the form of a reed switch is mounted on the base 11 and disposed below the oil damper cylinder 36. When the piston rod 37 is in its extended positon to retain the pickup arm 12 in its upper position, the permanent magnet 47 is disposed in vertical registry with the reed switch 48, as shown in phantom in FIG. 2. When the permanent magnet 47 is brought into registry with the reed switch 48, the reed switch 48 is activated by the magnetic field produced by the magnet 47 to detect the arrival of the pickup arm 12 at its upper postion.

The stylus of the pickup cartridge 14 tracks the groove in the record disc 16 during the record-playing so that the pickup arm 12 is angularly moved or displaced about the rod 17. A displacement angle-detection mechanism 50 is provided on the base 11 below the arm lifter 18 for detecting the angle of displacement of the pickup arm 12 during the record-playing. This mechanism 50 comprises a shield member 51 in the form of a sector which is fixedly mounted on the lower end of the rod 17 at its reduced end, the shield member 51 having an aperture 52 formed therethrough. A light-emitting diode 53 and a phototransistor 54 are supported on the base 11 and are disposed in vertical registry with each other. The shield member 51 is disposed in a horizontal plane between the light-emitting diode 53 and the phototransistor 54. The light-emitting diode 53 is adapted to emit light to the phototransistor 54 through the aperture 52. When the pickup arm 12 is slightly angularly moved or displaced horizontally about the rod 17, the aperture 52 is correspondingly displaced relative to the aligned light-emitting diode 53 and phototransistor 54, so that the angle of displacement of the pickup arm 12 is detected through the amount of the light which the phototransistor 54 receives from the light-emitting diode 53.

A brake means 55 is provided below the arm lifter 18 for holding the pickup arm 12 against the horizontal angular movement about the rod 17 during the downward movement thereof. The brake means 55 comprises an elongated brake arm 57 disposed horizontally in overlying relation to the shield member 51 and extending substantially perpendicular thereto. The brake arm 57 has an integral brake plate 58 depending from one lateral edge thereof intermediate opposite ends thereof. The front edge 51a of the shield member 51 is disposed in opposed relation to the brake plate 58. The brake arm 57 is pivotally mounted at one end thereof on the base 11 through a pivot pin 60. The brake arm 57 has an aperture 61 formed through the one end thereof. A mounting plate 62 having a fixed pin 63 is fixedly secured to a mounting wall 11c of the base 11. A tension coil spring 64 extends between the pin 63 and the aperture 61 to normally urge the pivotal brake arm 57 in a direction G (FIG.2).

A braking solenoid 66 is fixedly secured to a mounting wall 11d of the base 11 and has a plunger 67 operatively associated therewith. A pin 68 is fixedly secured to the front end of the plunger 67 and journaled in the end of the brake arm 57 remote from the pivot pin 60. A cylindrical cam 70 is rotatably mounted on an eccentric pin 71 which is supported on the base 11. The end portion 57a of the lateral edge of the brake arm 57 is held in contact with the cam 70 to limit the angular movement of the brake arm 57 about the pivot pin 60 in the direction G.

With this construction, when the solenoid 66 is energized to retract the plunger 67 in a direction indicated by an arrow I in FIG. 2, the brake arm 57 is pivotally moved about the pin 60 in a direction H (FIG. 2) so that the brake plate 58 is brought into engagement with the front edge 51a of the shield member 51 to hold the pickup arm 12 against horizontal angular movement about the rod 17. Thus, the shield member 51 also serves as a retaining plate for retaining the pickup arm 12 against angular movement. The rotatable cam 70 can be preset at any angular position relative to the pin 71 to determine a desired distance between the brake plate 58 and the front edge 51a of the shield member 51 when the end portion 57a of the lateral edge of the brake arm 57 is disposed in contact with the cam 70.

Figure 3:
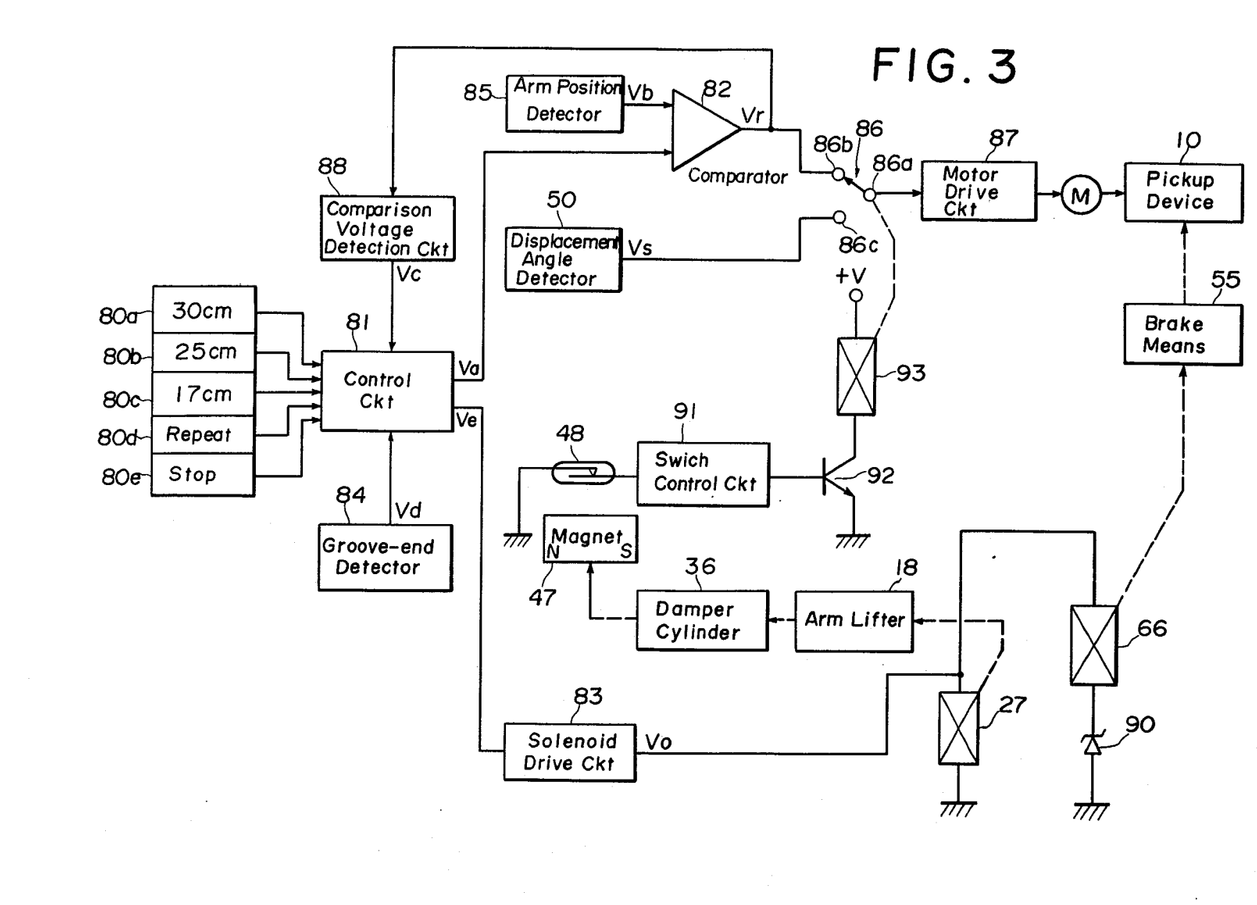
FIG. 3 is a block diagram of a drive control circuit for the pickup device.

FIG. 3 is a block diagram of a drive control circuitry of the pickup device 10. Three lead-in operation switches 80a, 80b, 80c are connected to a control circuit 81, these three switches being operated selectively depending on three kinds of record discs having diameters of 30 cm, 25 cm and 17 cm, respectively. A repeat operation switch 80d for repeating a reproduction of the record disc 16, and a stop operation switch 80e for interrupting the record-playing are also connected to the control circuit 81. The control circuit 81 provides an output signal Va to a comparator 82 and an output signal Ve to a solenoid drive circuit 83. The output voltage Va is representative of the rest position of the pickup arm 12 and the three lead-in positions of the pickup arm 12 corresponding respectively to the three kinds of record discs of different diameters, the rest position and the three lead-in positions being spaced along the linear track along which the pickup arm 12 is movable in the opposite directions A and B (FIG. 1). With this arrangement, when one of the lead-in switches 80a to 80c is operated, the output voltage Va is indicative of the corresponding lead-in position of the pickup arm 12. Also, when a signal Vd is fed from a groove-end detector 84 to the control circuit 81, the output voltage Va is representative of the rest position of the pickup arm 12.

The comparator 82 functions to compare the output voltage Va with an output voltage Vb of an arm-position detector 85 to produce an output signal Vr which is supplied through a switch 86 to an input of a motor drive circuit 87 and also to an input of a comparison voltage detection circuit 88. The arm-position detector 85 detects the position of the pickup arm 12 in the directions A and B (FIG.1) and feeds the output signal Vb representative of this position. The motor drive circuit 87 is responsive through the switch 86 to the output signal Vr of the comparator 82 or an output signal Vs of the displacement angle detection mechanism 50 for driving a motor M. The output signal Vs is produced by the phototransistor 54 and is representative of the angle of displacement of the pickup arm 12 about the rod 17. The motor M is operatively associated with the pickup device 10 so that upon energization of the motor M the pickup device 10 is moved in the directions A and B. As described above, the displacement angle detection mechanism 50 serves to detect the angular movement of the pickup arm 12 about the rod 17 during the record-playing when the stylus of the pickup cartridge 14 tracks the groove in the record disc 16. The output signal Vs of the displacement angle detection mechanism 50 is representative of the angular movement of the pickup arm 12 about the rod 17.

The comparison voltage detection circuit 88 produces an output signal Vc when the output voltage Vr of the comparator 82 applied thereto becomes zero. The groove-end detector 84 supplies the output signal Vd to the control circuit 81 upon arrival of the stylus of the pickup cartridge 14 at the end portion of the groove (lead out groove) in the record disc 16. The output voltage Ve of the control circuit 81 goes high in response to the output signal Vc of the comparison voltage detection circuit 88, this high level signal Ve (H signal) constituting an arm-down signal. The output voltage Ve goes low in response to the output signal Vd of the groove-end detector 84, this low level signal (L signal) constituting an arm-up signal. The output voltage Va of the control circuit 81 is also switched to a voltage indicative of the rest position of the pickup arm 12 in response to the output signal Vd of the groove-end detector 84. When the repeat switch 80d is operated, the output voltage Va is set to the voltage representative of preselected one of the three lead-in positions. When the stop switch 80e is operated, the low level signal Ve is applied to the solenoid drive circuit 83.

Figure 4A:
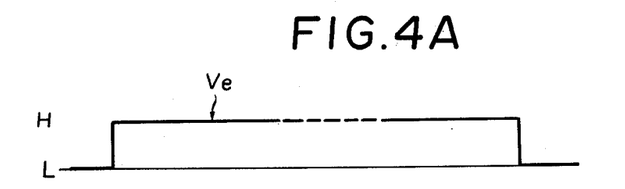
FIG. 4A is a diagrammatic illustration showing a waveform of an output signal of a control circuit incorporated in the drive control circuit.

The solenoid drive circuit 83 is responsive to the high level signal Ve to produce the output signal Vo (FIG. 4B), the output voltage Vo being maintained above a predetermined voltage level of Ea during a prescribed period of time t2 after the instant of transition of the output voltage Ve to its high level (FIG. 4A) and being maintained generally at a voltage level of Eb during a lasting period t3 (FIG. 4B) for reasons described later. The output signal Vo of the solenoid drive circuit 83 is applied to the cueing solenoid 27 and the braking solenoid 66. One terminal of the solenoid 27 is grounded, and one terminal of the solenoid 66 is connected to ground potential via a Zener diode 90. The other terminals of the solenoids 27 and 66 and the output of the solenoid drive circuit 83 are coupled together. The Zener diode 90 serves to apply a predetermined reverse bias voltage to the solenoid 66. With this arrangement, the solenoids 27 and 66 are operated in response to the output signal Vo applied thereto. More specifically, the solenoid 27 is actuated for a period of time t1 (FIG. 4B) during which the output voltage Vo is maintained at above the voltage level Eb. The solenoid 66 is actuated for the time period t2 during which the output voltage Vo is maintained above Ea(v). The time period t2 represents a time of movement of the pickup arm 12 from its upper to lower position, and is predetermined by the Zener voltage of the Zener diode 90.

Figure 4B:
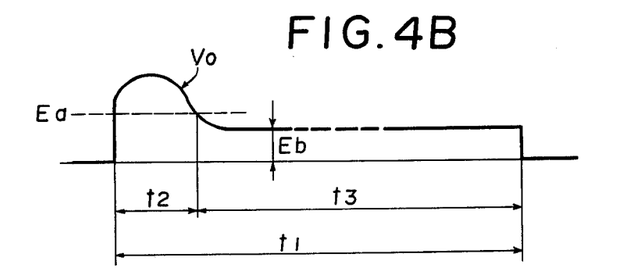
FIG. 4B is a diagrammatic illustration representing a waveform of an output signal of a solenoid drive circuit incorporated in the drive control circuit.
Figure 5:
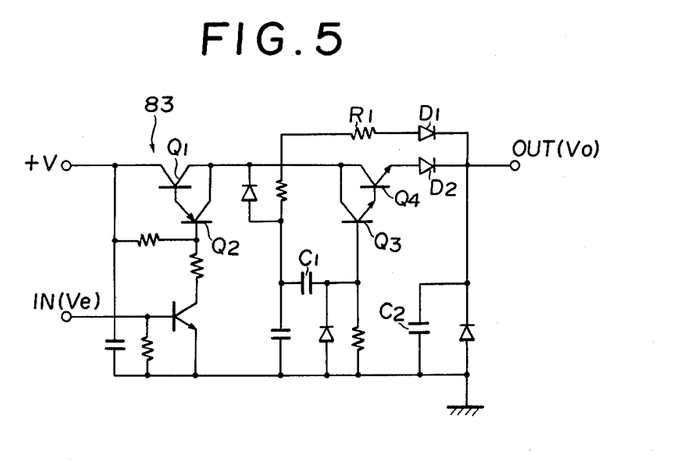
FIG. 5 is a circuit diagram of the solenoid drive circuit.

FIG. 5 shows a circuit diagram of the solenoid drive circuit 83. When the output signal Ve of the control circuit 81 goes high, transistors Q1 and Q2 are turned on so that current is supplied from a positive voltage supply terminal (+V) through a capacitor C1 to a base of a transistor Q3. Accordingly, transistors Q3 and Q4 are turned on, so that a path comprising serially connected resistor R1 and diode D1 is connected in parallel to a conductive path comprising the transistors Q3 and Q4 and diode Q2 to produce the output voltage Vo of a relatively high level. In a while, as the base current to the transistors Q3 and Q4 decreases, the output voltage Vo goes low in response to the decrease of conductiveness of the path comprising transistors Q3 and Q4 and the diode D2. A capacitor C2 serves to make a waveform of the output signal Vo smooth as shown in FIG. 4B.

As described above, the solenoid 27 is energized to retract the plunger 28 to move the pickup arm 12 from its upper to lower position through the arm lifter 18, with the piston rod 37 of the oil damper cylinder 36 being retracted against the bias of the compression spring 40. Upon de-energization of the solenoid 27, the piston rod 37 is extended in the direction E under the influence of the compression spring 40 so that the pickup arm 12 is moved from its lower to upper position through the arm lifter 18, with the plunger 28 being moved to its extended position. During the movement of the pickup arm 12 from its upper to lower position, the braking solenoid 66 is maintained in an energized state to hold the brake plate 58 into engagement with the shield member 51 to retain the pickup arm 12 against the horizontal angular movement about the rod 17.

As described above, the permanent magnet 47 attached to the mounting plate 46 of the piston rod 37 is brought into registry with the reed switch 48 to turn it on when the piston rod 37 is in its extended position to hold the pickup arm 12 in its upper position. Also, the permanenet magnet 47 is brought out of registry with the reed switch 48 to turn it off when the pickup arm 12 is moved from its upper to lower position. The reed switch 48, when turned on, feeds an on-signal to a switch control circuit 91. The switch control circuit 91 is responsive to the on-signal of the reed switch 48 to supply an output signal to a transistor 92 to turn it on so that a solenoid 93 is energized to bring a movable contact 86a of the switch 86 into engagement with one contact 86b thereof, thereby making electrical connection between the comparator 82 and the motor drive circuit 87. On the other hand, when the reed switch 48 is deactivated, the transistor 92 is turned off through the switch control circuit 91 so that the solenoid 93 is de-energized to bring the movable contact 86a into engagement with the other contact 86c, thereby making electrical connection between the displacement-angle detection mechanism 50 and the motor drive circuit 87.

The operation of the pickup device 10 will now be described. In this operation, the record disc 16 having a diameter of 30 cm is employed.

Before the record-playing, the pickup arm 12 is retained in its rest position. In this condition, the pickup arm 12 is held in its upper position, and the reed switch 48 is in an ON-state so that the movable contact 86a of the switch 86 is engaged with the contact 86b to connect the comparator 82 to the motor drive circuit 87. The lead-in switch 80a for a 30 cm record disc is operated so that the control circuit 81 produces the output voltage Va corresponding to the lead-in position for the 30 cm record disc, this output signal Va being applied to one input of comparator 82. The comparator 82 compares the output voltage Va with the output voltage Vb of the arm-position detector 85 to produce the output voltage Vr, the output signal Vb being representative of the position of pickup arm 12 in the directions A and B (FIG. 1). The output voltage Vr is represented by the following formula:

$$Vr = K(Va - Vb) > 0 \quad (K: \text{a positive constant})$$

The output signal Vr of the comparator 82 is fed to the motor drive circuit 87 through the switch 86 to drive the motor M in a normal direction so that the pickup device 10 is moved along the linear track in the direction A. The output voltage Vr is also delivered to the comparison voltage detection circuit 88. Then, the pickup arm 12 is brought into the lead-in position for the 30 cm record disc whereupon the output voltage Vb becomes equal to the output voltage Va, thereby reducing the output voltage Vr of the comparator 82 to zero. Upon reduction of the output voltage Vr to zero, the motor drive circuit 87 is de-energized to stop the motor M. Thus, the pickup arm 12 is stopped at the lead-in position for the 30 cm record disc.

When the output voltage Vr of the comparator 82 becomes zero, the comparison voltage detection circuit 88 feeds the output signal Vc to the control circuit 81. The output voltage Ve goes high in response to the output signal Vc of the comparison voltage detection circuit 88. The solenoid drive circuit 83 is responsive to this high level signal Ve to produce the output signal Vo (FIG. 4B). The cueing solenoid 27, when supplied with the output signal Vo, is energized to retract the plunger 28 to move the pickup arm 12 from its upper to lower position so that the stylus of the pickup cartridge 14 is brought into engagement with the groove in the record disc 16. The braking solenoid 66, when supplied with the output signal Vo, is energized to retract the plunger 67 so that the brake arm 57 is pivotally moved about the pin 60 to bring the brake plate 58 into engagement with the shield member 51, thereby preventing the pickup arm 12 from being angularly moved about the rod 17 during the movement of the pickup arm 12 from its upper to lower position (time period t2). Therefore, the stylus of the pickup cartridge 14 is brought into engagement in position with the groove in the record disc 16 to enable the proper record-playing.

When the pickup arm 12 is moved from its upper to lower position by the cueing solenoid 27, the piston rod 37 of the oil damper cylinder 36 is moved in the direction F through the arm lifter 18 so that the magnet 47 is brought out of registry with the reed switch 48 to turn it off. Upon deactivation of the reed switch 48, the transistor 92 is turned off through the switch control circuit 91 to de-energize the solenoid 93 so that the movable contact 86a of the switch 86 is brought into engagement with the contact 86c. Thus, after the stylus of the pickup cartridge 14 is engaged with the groove in the record disc 16, the output signal Vs of the displacement angle detection mechanism 50 is applied through the switch 86 to the motor drive circuit 87, the output signal Vs being representative of the angle of displacement of the pickup arm 12 in the direction tangential to a circular groove of the record disc 16. During the record-playing, the stylus of the pickup cartridge 14 tracks the groove in the record disc 16, and when the pickup arm 12 is slightly angularly moved or displaced about the rod 17, the motor drive circuit 87 is responsive to the output signal Vs indicative of this displacement angle of the pickup arm 12 to power the motor M so that the pickup device 10 is slightly moved along the linear track to rectify this angular displacement. It will be appreciated that upon rectification of the angular displacement of the pickup arm 12, the motor drive circuit 87 is de-energized to stop the motor M. This rectification operation is continuously repeated during the record-playing.

After the record-playing is completed, the pickup arm 12 is automatically returned to its rest position. More specifically, when the stylus of the pickup cartridge 14 arrives at the end portion of the groove (lead out groove) in the record disc 16, the groove-end detector 84 applies the output signal Vd to the control circuit 81 so that the output voltage Ve of the control circuit 81 goes low. The output voltage Vo of the solenoid drive circuit 83 becomes zero (FIG. 4B) when the low level signal Ve is applied to the solenoid drive circuit 83, so that the cueing solenoid 27 is de-energized. Also, when the output signal Vd is applied to the control circuit 81, the output voltage Va is switched to a voltage corresponding to the rest position of the pickup arm 12. Upon de-energization of the cueing solenoid 27, the piston rod 37 of the oil damper cylinder 36 is moved in the direction E under the influence of the compression spring 40 so that the pickup arm 12 is moved from its lower to upper position through the arm lifter 18. At this time, the magnet 47 is brought into registry with the reed switch 48 to turn it on so that the transistor 92 is turned on through the switch control circuit 91 to energize the solenoid 93. Upon energization of the solenoid 93, the movable contact 86a of the switch 86 is brought into engagement with the contact 86b to make electrical connection between the comparator 82 and the motor drive circuit 87. The comparator 82 compares the output voltage Va corresponding to the rest position of the pickup arm 12 with the output voltage Vb of the arm-position detector 85 to produce the output voltage Vr[Vr=K(Va−Vb)<0]. This negative output voltage Vr is applied through the switch 86 to the motor drive circuit 87 so that the motor M is rotated in its reverse direction through the motor drive circuit 87. Therefore, the pickup device 10 is moved along the linear track in the direction B. Then, the pickup arm 12 is brought into its rest position whereupon the output voltage Vb becomes equal to the output voltage Va, thereby reducing the output voltage Vr of the comparator 82 to zero. Upon reduction of the output voltage Vr to zero, the motor drive circuit 87 is de-energized to stop the motor M. When the pickup arm 12 is in its rest position, the comparison voltage detection circuit 88 is rendered inoperative through an associated circuit (not shown) even when the output voltage Vr of 0 volt is applied thereto.

Figure 6:
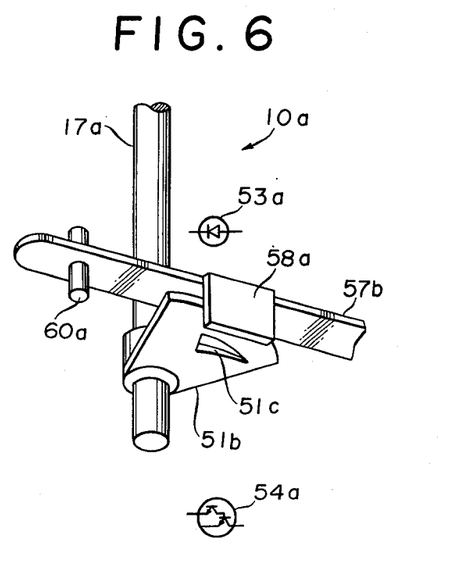
FIG. 6 is a fragmentary perspective view of a pickup device comprising a pickup arm of the angularly movable type.

FIG. 6 shows a portion of a pickup device 10a which comprises a pickup arm (not shown) fixedly mounted at its one end on a rod 17a for angular movement therewith, the pickup arm carrying a pickup cartridge at the other end. This pickup device is not movable along a linear track during the record-playing, and the pickup arm is angularly moved about the rod 17a toward the center of a record disc as the record-playing proceeds. The pickup device comprises an automatic return device for automatically returning the pickup arm to its rest position after the record-playing is completed. The automatic return device comprises a means for detecting the arrival of a stylus of the pickup cartridge at an end portion of a groove (lead out groove) in a record disc. This detection means comprises a shield plate 51b in the form of a sector fixedly secured to the lower end of the rod 17a for angular movement therewith, a light-emitting diode 53a, and a phototransistor 54a disposed in vertical registry with the light-emitting diode. The shield plate 51b is disposed in a horizontal plane between the aligned light-emitting diode 53a and phototransistor 54a and has a slot 51c of a generally elongated triangular shape. The phototransistor 54a receives the light from the light-emitting diode 53a through the slot 51c. The arrangement of the slot 51c is such that the phototransistor 54a receives a gradually increasing light from the light-emitting diode 53a as the pickup arm moves toward the center of the record disc. When the stylus of the pickup cartridge arrives at the end portion of the groove (lead out groove) in the record disc, a sensing signal is fed from the phototransistor 54a to an associated electrical circuit for operating an associated mechanical means to return pickup tone arm to the rest position. When the pickup arm is moved from its upper to lower position to bring the stylus of the pickup cartridge into engagement with the groove in the record disc, a brake arm 57b is pivotally moved about a pivot pin 60a by a plunger-type solenoid (not shown) to bring a brake plate 58a into engagement with the shield plate 51b, thereby preventing the pickup arm from being angularly moved about the rod.

What is claimed is:

1. A pickup device for a disc player comprising:
   (a) a pickup arm pivotally mounted at one end thereof for movement between upper and lower positions, said pickup arm being horizontally angularly movable about said one end, and said pickup arm carrying a pickup cartridge at the other end thereof;
   (b) an arm lifter operatively engaged with said pickup arm;
   (c) control circuit means for producing a driving signal;
   (d) drive means responsive to said driving signal for driving said arm lifter for moving said pickup arm between its upper and lower positions; and
   (e) brake means responsive to said driving signal for holding said pickup arm against horizontal angular movement during its vertical movement when said driving signal derived from said control circuit means and to said brake means, application of said driving signal to said drive means and to said brake means start at the same time.

2. A pickup device according to claim 1, in which said drive means comprises a first solenoid operatively connected to said arm lifter, said brake means comprising a brake arm, and a second solenoid operatively connected to said brake arm for operatively engaging said brake arm to said pickup arm to hold it against the horizontal angular movement.

3. A pickup device according to claim 2, in which said pickup arm is mounted on a vertical rod for horizontal angular movement thereabout, said brake arm being operatively engageable with said rod to hold said pickup arm against the horizontal angular movement.

4. A pickup device according to claim 3, in which said brake arm is pivoted at one end thereof, a retaining member being fixedly mounted on a lower portion of said rod for angular movement therewith, said brake arm being brought into engagement with said retaining member by said second solenoid to hold said pickup arm against horizontal angular movement.

5. A pickup device according to claim 2, in which said driving signal is applied in parallel to said first and second solenoids.

6. A pickup device according to claim 5, in which said driving signal is maintained at a relatively high level for a predetermined initial period so that said second solenoid is responsive to said high level signal for moving said brake arm into operative engagement with said pickup arm.

7. A pickup device according to claim 6 in which said initial period of said driving signal is determined by reverse bias means serially connected to said second solenoid.

8. A pickup device for a disc player comprising:
   (a) a pickup arm arm pivotally mounted at one end thereof for movement between upper and lower positions, said pickup arm being horizontally angularly movable about said one end, and said pickup carrying a pickup cartirdge at the other end thereof;
   (b) an arm lifter operatively engaged with said pickup arm;
   (c) control circuit means for producing a driving signal;
   (d) drive means responsive to said driving signal for driving said arm lifter for moving said pickup arm between its upper and lower positions; and
   (e) brake means responsive to said driving signal for holding said pickup arm against horizontal angular movement during its vertical movement;

said drive means comprising a first solenoid operatively connected to said arm lifter, said brake means comprising a brake arm, and a second solenoid operatively connected to said brake arm for operatively engaging said brake arm to said pick-up arm to hold it against horizontal angular movement, said pickup arm being mounted on a vertical rod for horizontal angular movement thereabout, said brake arm being operatively engageable with said rod to hold said pickup arm against the horizontal angular movement, said brake arm being pivoted at one end thereof, a retaining member being fixedly mounted on a lower portion of said rod for angular movement therewith, said brake arm being brought into engagement with said retaining member by said second solenoid to hold said pickup arm against horizontal angular movement, further comprising a detector for detecting the horizontal angular movement of said pickup arm about said rod, said detector comprising light-emitting means and photosensitive means, said retaining member being disposed between said light-emitting means and said photosensitive means and said retaining member having an aperture through which said photosensitive means receives the light emitted from said light-emitting means to produce a detection signal.

* * * * *

UNITED STATES PATENT AND TRADEMARK OFFICE
CERTIFICATE OF CORRECTION

PATENT NO. : 4,460,991

DATED : July 17, 1984

INVENTOR(S) : Hideo Omoto

It is certified that error appears in the above-identified patent and that said Letters Patent is hereby corrected as shown below:

Claim 1 should read as follows:

1. A pickup device for a disc player comprising:
    (a) a pickup arm pivotally mounted at one end thereof for movement between upper and lower positions, said pickup arm being horizontally angularly movable about said one end, and said pickup arm carrying a pickup cartridges at the other end thereof:

(b) an arm lifter operatively engaged with said pickup arm;

(c) control circuit means for producing a driving signal;

(d) drive means responsive to said driving signal for driving said arm lifter for moving said pickup arm between its upper and lower positions; and

UNITED STATES PATENT AND TRADEMARK OFFICE
CERTIFICATE OF CORRECTION

PATENT NO. :  4,460,991　　　　　　　　　　　　　　　Page 2 of 2

DATED      :  July 17, 1984

INVENTOR(S) :  Hideo Omoto

It is certified that error appears in the above-identified patent and that said Letters Patent is hereby corrected as shown below:

> (e) brake means responsive to said driving signal for holding said pickup arm against the horizontal angular movement during its vertical movement.

Signed and Sealed this

Seventeenth Day of September 1985

[SEAL]

*Attest:*

*Attesting Officer*

DONALD J. QUIGG

*Commissioner of Patents and Trademarks—Designate*